(12) United States Patent
Garlick et al.

(10) Patent No.: US 6,353,576 B1
(45) Date of Patent: Mar. 5, 2002

(54) DETECTOR IN ULTRASONIC HOLOGRAPHY

(75) Inventors: George F. Garlick; Jerod O. Shelby, both of Richland, WA (US)

(73) Assignee: Advanced Diagnostics Systems, Inc., Richland, WA (US)

( * ) Notice: Subject to any disclaimer, the term of this patent is extended or adjusted under 35 U.S.C. 154(b) by 9 days.

(21) Appl. No.: 09/589,863

(22) Filed: Jun. 8, 2000

(51) Int. Cl.[7] .................. G01N 29/04; G03H 3/00
(52) U.S. Cl. ................ 367/10; 367/8; 73/603; 73/605; 359/901
(58) Field of Search ............ 367/7, 8, 10; 73/603, 73/605; 359/9, 901

(56) References Cited

U.S. PATENT DOCUMENTS

| | | | |
|---|---|---|---|
| 3,879,989 A | * 4/1975 | Brenden | 73/603 |
| 3,983,529 A | * 9/1976 | Langlois | 367/10 |
| 4,662,222 A | 5/1987 | Johnson | 73/602 |
| 5,179,455 A | 1/1993 | Garlick | 359/9 |
| 5,212,571 A | 5/1993 | Garlick et al. | 359/9 |
| 5,235,553 A | 8/1993 | Garlick et al. | 367/7 |
| 5,329,202 A | 7/1994 | Garlick et al. | 310/334 |
| 5,329,817 A | 7/1994 | Garlick et al. | 73/605 |
| 5,999,836 A | 12/1999 | Nelson et al. | 600/407 |

* cited by examiner

*Primary Examiner*—Ian J. Lobo
(74) *Attorney, Agent, or Firm*—Seed IP Law Group, PLLC

(57) ABSTRACT

There is disclosed an improved ultrasonic hologram or other ultrasonic imaging process that accurately forms phase and amplitude information of the hologram in a manner that renders the unit relatively insensitive to environment vibrations, and provides long maintenance free functioning lifetime. Specifically, there is disclosed an improved ultrasonic hologram detector component that forms an ultrasonic hologram on the surface of a detection fluid, resulting from the deformation of the surface. The surface deformation is due to the reflection of an ultrasound (ultrasonic) energy profile of the combination of an "object wave" that passes through an object and that of a "reference wave" that is directed to the surface at an off axis angle from the "object wave".

14 Claims, 5 Drawing Sheets

DETECTOR IN ULTRASONIC HOLOGRAPHY

TECHNICAL FIELD OF THE INVENTION

The present invention provides an improved ultrasonic holography or other ultrasonic imaging process that accurately forms the phase and amplitude information of the hologram in a manner that renders the unit insensitive to environment vibrations, and provides long maintenance free functioning lifetime. Specifically, the improved ultrasonic hologram detector component forms an ultrasonic hologram on the surface of a liquid that results from the deformation of the surface. This is due to the reflection of an ultrasound energy profile of a combination of an "object wave" that passes through the object and that of a "reference wave" that is directed to the surface at an off axis angle from the "object wave".

BACKGROUND OF THE INVENTION

The central element field of holography is fulfilled by combining or interfering an object wave or energy with a reference wave or energy to form an interference pattern referred to as the hologram. A fundamental requirement for the forming of the hologram and the practice of holography is that the initial source of the object wave and reference wave or energy are coherent with respect to the other wave. That is to say, that all parts of both the object wave and the reference wave are of the same frequency and of a defined orientation (a fixed spatial position and angle between the direction of propagation of the two sources). When performing holography the object wave is modified by interference with structure within the object of interest. As this object wave interacts with points of the object the free-dimensional features of the object impart identifying phase and amplitude changes on the object wave. Since the reference wave is an unperturbed (pure) coherent wave, its interference with the object wave results in an interference pattern which identifies the 3-D positioning and characteristics (ultrasonic absorption, diffraction, reflection, and refraction) of the scattering points of the object.

A second process, (the reconstruction of the hologram) is then performed when a coherent viewing source (usually light from a laser) is transmitted through or reflected from the hologram. The hologram pattern diffracts light from this coherent viewing or reconstructing source in a manner to faithfully represent the 3-D nature of the object, as seen by the ultrasonic object wave.

To reiterate, to perform holography coherent wave sources are required. This requirement currently limits practical applications of the practice of holography to the light domain (e.g., a laser light) or the domain of acoustics (sometimes referred to as ultrasound due to the practical application at ultrasonic frequencies) as these two sources are currently the only available coherent energy sources. Thus, further references to holography or imaging system will refer to the through transmission holographic imaging process that uses acoustical energies usually in the ultrasonic frequency range. In the practice of ultrasound holography, one key element is the source of the ultrasound, such as a large area coherent ultrasound transducer. A second key element is the projection of the object wave from a volume within the object (the ultrasonic lens projection system) and a third is the detector and reconstruction of the ultrasonic hologram into visual or useful format.

Although other configurations can be utilized, a common requirement of the source transducers for both the object and reference waves is to produce a large area plane wave having constant amplitude across the wave front and having a constant frequency for a sufficient number of cycles to establish coherence. Such transducers will produce this desired wave if the amplitude of the ultrasound output decreases in a Gaussian distribution profile as the edge of the large area transducer is approached. This decreasing of amplitude reduces or eliminates the "edge effect" from the transducer edge, which would otherwise cause varying amplitude across the wave front as a function distance from the transducer.

In the process of through transmission ultrasonic holographic imaging, the pulse from the object transducer progresses through the object, then through the focusing lens and at the appropriate time, the pulse of ultrasound is generated from the reference transducer such that the object wave and reference wave arrive at the detector at the same time to create a interference pattern (the hologram). For broad applications, the transducers need to be able to operate at a spectrum or bandwidth of discrete frequencies. Multiple frequencies allow comparisons and integration of holograms taken at selected frequencies to provide an improved image of the subtle changes within the object.

A hologram can also be formed by directing the object wave through the object at different angles to the central imaging axis of the system. This is provided by either positioning or rotating the object transducer around the central axis of transmission or by using multiple transducers positioned such that the path of transmission of the sound is at an angle with respect to the central axis of transmission.

With a through-transmission imaging system, it is important to determine the amount of resolution in the "z" dimension that is desirable and achievable. Since the holographic process operates without limits of mechanical or electronic devices but rather reconstructs images from wave interactions, the resolution achievable can approach the theoretical limit for the wavelength of the ultrasound used. However, it may be desirable to limit the "z" direction image volume so that one can "focus" in on one thin volume slice. Otherwise, the amount of information may be too great. Thus, it is of value to develop a means for projecting a planar slice within a volume into the detector plane. One such means is a large aperture ultrasonic lens system that will allow the imaging system to "focus" on a plane within the object. Additionally, this lens system and the corresponding motorized, computer controlled lens drive will allow one to adjust the focal plane and at any given plane to be able to magnify or demagnify at that z dimension position.

The image is detected and reconstructed at the detector. Standard photographic film may be used for the recording of light holograms and the 3-D image reconstructed by passing laser light through the film or reflecting it from the hologram pattern embossed on the surface of an optical reflective surface and reconstructing the image by reflecting light from the surface. However, there is no equivalent "film" material to record the intricate phase and amplitude pattern of a complex ultrasonic wave. One of the most common detectors uses a liquid-air surface or interface to record, in a dynamic way, the ultrasonic hologram formed. The sound energy at the frequency of ultrasound (above range of human hearing) will propagate with little attenuation through a liquid (such as water) but cannot propagate through air. At these higher frequencies (e.g., above 1 MHz) the ultrasound will not propagate through air because the wavelength of the sound energy is so short ($\lambda$(wavelength)=v(velocity)/f (frequency)). The density of air (approximately 0.00116 $g/cm^3$) is not sufficient to couple these short wavelengths and allow them to propagate. On the other hand the density of a liquid (e.g., water) is a favorable media to couple and propagate such sound. For example, the velocity of sound in air is approximately 330 meters/second whereas in water it is approximately 1497 meter/second (room temperature). Thus, for water, both the density (1 g/cm$^3$) and the wavelength (~1.48 mm at 1 MHz) are significantly large such that ultrasound can propagate with little attenuation. Whereas, for air both the density (0.00116 g/cm$^3$) and wavelength (0.33 mm at 1 MHz) are sufficiently small such that the energy at these ultrasonic frequencies will not propagate.

Thus, when ultrasound propagating in a liquid encounters a liquid-air interface the entire amount of the energy is reflected back into the liquid. Since ultrasound (or sound) propagates as a mechanical force it is apparent that the reflection (or changing direction of propagation) will impart a forward force on this liquid air interface. This force, in turn, will distort the surface of the liquid. The amount of surface distortion will depend upon the amplitude of the ultrasound wave at each point being reflected and the surface tension of the liquid. Thus, the pattern of the deformation is the pattern of the phase and amplitude of the ultrasonic wave.

It is in this manner that a liquid-air interface can be commonly used to provide a near realtime recorder ("film equivalent") for an ultrasonic hologram. The shape of the surface deformation on this liquid-air detector is the representation of the phase and amplitude of the ultrasonic hologram formed by the interference of the object and reference ultrasonic waves.

The greatest value of the ultrasonic holographic process is achieved by reconstructing the hologram in an usable manner: usually in light, to make visible the structural nature of the initial object. In the case of a liquid-air interface, the reconstruction to achieve the visible image is accomplished by reflecting a coherent light from this liquid-air surface. This is the equivalent process to reflecting laser light from optically generated hologram that is embossed on the surface of a reflecting material (e.g., thin aluminum film).

The reflected light is diffracted (scattered) by the hologram to diffracted orders, each of which contains image information about the object. These diffracted orders are referred to as ±n th orders. That part of the reconstructing light that does not react with the hologram is referred to as zero order and is usually blocked so that the weaker diffracted orders can be imaged. The higher the diffracted order the greater the separation angle from the zero order of reflected light.

Once reconstructed, the image may be viewed directly, by means of a video camera or through post processing.

Ultrasonic holography as typically practiced is illustrated in FIG. 1. A plane wave of sound (1a) (ultrasound) is generated by the object (large area) transducer (1) (U.S. Pat. No. 5,329,202). The sound is scattered (diffracted) by structural points within the object (2). The scattered sound is from the internal object points that lie in the focal plane (2a) are focused (projected) into the ultrasonic hologram plane (6). The focusing takes place by use of ultrasonic lens (3) (U.S. Pat. No. 5,235,553) which focuses the scattered sound into a hologram detector surface (6) and the unscattered sound into a point (4). The lens system also allows the imaging process to magnify the image or change focus position (U.S. Pat. No. 5,212,571). Since the focus-point of the unscattered sound (4) is prior to the holographic detector plane (6), this portion of the total sound again expands to form the transparent image contribution (that portion of the sound that transmitted through the object as if it were transparent or semitransparent). In such an application, an ultrasound reflector (5) is generally used to direct the object sound at a different angle (preferably vertically to allow for the holographic detector to have a surface parallel to ground to avoid gravity effects), thus impinging on horizontal detector plane usually containing a liquid which is deformed by the ultrasound reflecting from the liquid-air interface. When the reference wave (7) and the object wave are simultaneous reflected from this detector, the deformation of the liquid-air interface is the exact pattern of the ultrasonic hologram formed by the object wave (1a combined with 2a) and the "off-axis" reference wave (7).

This ultrasonic hologram formed in the holographic detector (6) is subsequently reconstructed for viewing by using a coherent light source (9), which may be passed through an optical lens (8), and reflected from the holographic detector surface (U.S. Pat. No. 5,179,455). This reflected coherent light contains two components. These are A: The light that is reflected from the ultrasound hologram which was not diffracted by the ultrasonic holographic pattern which is focused at position (10) and referred to as undiffracted or zero order light; and B: The light that does get diffracted from/by the ultrasonic hologram is reflected at an "off-axis" angle from the zero order at position (11) and referred to as the "first order" image view when passed through a spatial filter (12). It is noted that this reconstruction method produces multiple diffraction orders each containing the ultrasonic object information. Note also both + and − multiple orders of the diffracted image are present and can be used individually or in combinations to view the optical reconstructed image from the ultrasonically formed hologram by modifying the spatial filter (12) accordingly.

The practice of ultrasonic imaging is in the industrial or hospital settings where insensitivity to vibrations and long term stable operations are important to the successful use of the system. It is further a requirement that the detector method be able to image subtle structures within the object being imaged and to often provide individual frames on images as fast as 120 per second. This need is particularly strong, for example, for breast cancer screening techniques that now utilize invasive mammography (providing the patient with a dose of radiation from XRay imaging) and yet do not have high quality images that lend a sense of three dimensional structure to breast tissue.

Therefore, there is a need in the art to improve resolution characteristics of transmissive ultrasonic imaging, ability to operate in environments experiencing vibrations and to perform over extended periods of time without service or degradation of image quality.

SUMMARY OF THE INVENTION

The present invention provides an ultrasonic hologram detector apparatus comprising:

(a) a rigid housing component describing a cavity defined by a floor component composed of rigid polymeric material having an upper surface forming a first plane and lower surface forming a parallel second plane, and rigid side elements attached to the base, wherein the cavity defines an enclosed space of a dimension of the upper surface of the floor component and the rigid side elements of from about 1 cm to about 5 cm in height, wherein the distance between the upper surface and the lower surface of the floor component is from about 5 mm to about 7.5 mm;

(b) a layer of detection fluid contained within the cavity, wherein the detection fluid has a thickness of from about 0.2 mm to about 0.50 mm whereby surface or horizontal vibration waves at the frequencies experienced in buildings cannot be propagated; wherein the detection fluid has a surface tension of from about 12 dynes/cm to about 19 dynes/cm, wherein the detection fluid has a Kinematic viscosity of from about 1 cs to about 20 cs; and (c) an inert gas filling a space in the cavity above the detection fluid.

Preferably, the inert gas is selected from the group consisting of nitrogen, helium, argon, and combinations thereof. Most preferably, the thickness of the detection fluid within the cavity is a multiple of ¼ wavelengths at the frequency being used for imaging, whereby internal reflections within the detector liquid are minimized.

Preferably, the ultrasonic hologram detector further comprises a top of the cavity composed of optically transparent material. Most preferably, the optically transparent material is glass. Most preferably, the glass is formed into an optical focusing element (a lens) or an optically transparent sealing cover to the cavity. Most preferably the optically transparent top cover further comprises a heating element associated and in contact with the cover.

Preferably, the floor component material is characterized by (i) attenuation of ultrasonic energy of less than 8% per cm of the material, (ii) a velocity of shear waves mode ultrasound propagation that results in acoustical impedance such that a reflection shear wave mode is less than 2% at the boundary of the floor component material and transmission liquid medium, and (iii) reflection of a longitudinal mode of propagation for angles of incidence of greater than 60 degrees from normal to an interface with the ultrasound liquid transmission medium, whereby a velocity for longitudinal mode of greater than 1730 m/sec. Most preferably, the transmission liquid medium is water, wherein the floor component material has an ultrasonic shear wave impedance of from about 1170 to about 1900 and an ultrasonic impedance (velocity times the density) of greater than 1200 but less than 2000. Such selected characteristics will result in a shear wave mode reflection {$(zS-ZW)/(zS+zW))^2$ where $zS$ is the impedance of the shear wave in the floor component and $zW$ is the impedance of water} of less than 2.1% at the floor component/water media interface. Most preferably, the velocity for longitudinal mode in the floor component is greater than 1730 and less than 2700 m/sec. Preferably, the detection fluid has vapor pressure of from about 1 torr to about 5 torr. Preferably, the detection fluid has a velocity of sound of less than 1,000 m/Sec. Preferably, the detector fluid is a fluorinated (in place of hydrogen) organic compound having from 3 to 10 carbon atoms in a straight or branched chain or an aqueous solution with reduced surface tension additives, wherein the viscosity of the detector fluid is such that the deformation will be formed on the liquid surface in less than 200 micro seconds and yet will be quiescent within less than 0.0083 or (¹⁄₁₂₀) seconds. Most preferably, the velocity of the detection fluid is approximately that of water (1497 m/sec) when surface tension reduction additives are used.

DETAILED DESCRIPTION OF THE INVENTION

The present invention provides a long life sealed hologram detector unit that is insensitive to vibrations in the area and provides improved image quality over previous hologram detectors. U.S. Pat. Nos. 5,329,817; 5,585,847; 5,179, 455; and 5,212,571 disclose an earlier embodiment for the forming an ultrasonic hologram on the surface of a liquid resulting from the deformation of the surface due to the reflection of the ultrasound energy profile of the combination of the "object wave" that passes through the object and that of the "reference wave" that is directed to the surface at an off axis angle from the "object wave". The earlier embodiment required constant vigilance for unstable operations due to evaporation of the liquid material, and fogging of an optical lens used to view the formed hologram image. The present invention, by contrast, provides an apparatus having a specific combination and configuration of components for an ultrasonic hologram detector or other ultrasonic imaging process that accurately forms the phase and amplitude information of the hologram in a manner the renders the unit insensitive to environment vibrations, capable of reflecting or transmitting coherent light to reconstruct images from the hologram, and provides long maintenance free functioning lifetime.

The present invention provides a hologram detector having a thick floor component comprising a solid polymeric material having an upper surface forming a first plane and a lower surface forming a second plane, wherein the first plane is essentially parallel to the second plane and wherein the detector apparatus is positioned such that the first plane and second planes are essentially perpendicular to the force of gravity.

Floor Component

Figure 1:
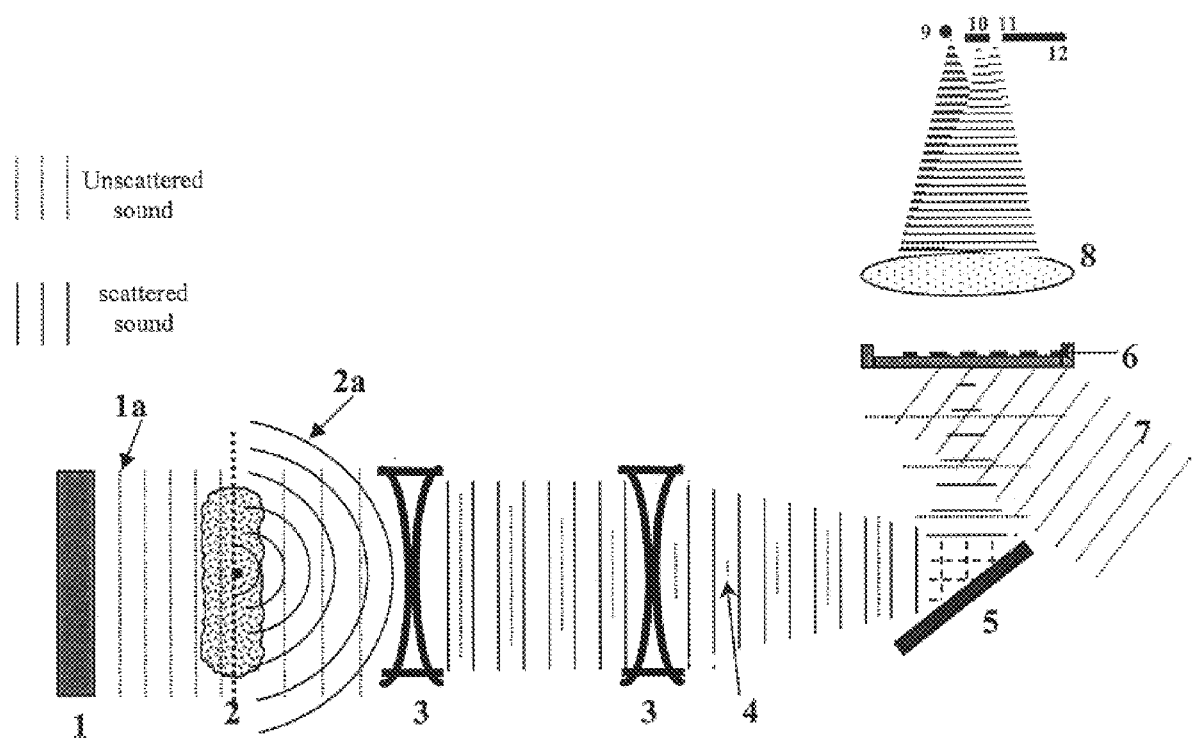
FIG. 1 shows the state of the prior art illustrating the operation of ultrasonic holography (see U.S. Pat. No. 5,179, 455 FIG. 3). Specifically, a plane wave of sound (1a) (ultrasound) is generated by the object (large area) transducer (1) (U.S. Pat. No. 5,329,202). The sound is scattered (diffracted, refracted, etc.) by structural points within the object (2). The scattered sound is from the internal object points that lie in the focal plane (2a) are focused (projected) into the ultrasonic hologram plane (6) (U.S. Pat. No. 5,329, 817). The focusing takes place by use of ultrasonic lens (3) (U.S. Pat. No. 5,235,553) which focuses the scattered sound into a hologram detector surface (6) and the unscattered sound into a point (4). Since the focus point of the unscattered sound (4) is prior to the holographic detector plane (6), this portion of the total sound again expands to form the transparent image contribution (that portion of the sound that transmitted through the object as if it were transparent or semitransparent). In such an application, an ultrasound reflector (5) is used to direct the object sound at a different angle (preferably vertically to allow for the holographic detector to have a surface parallel to ground to avoid gravity effects), thus impinging on horizontal detector plane usually containing a liquid (detection fluid) which is deformed by the ultrasound reflecting from the liquid-air interface. When the reference wave (7) and the object wave are simultaneous reflected from this detector, the deformation of the liquid-air interface is the exact pattern of the ultrasonic hologram formed by the object wave (1) and the "off-axis" reverence wave (7). The image produced by the apparatus of FIG. 1 (if no object present) is a completely white image. If there is a completely acoustically opaque object, the image will be black.
Figure 2:
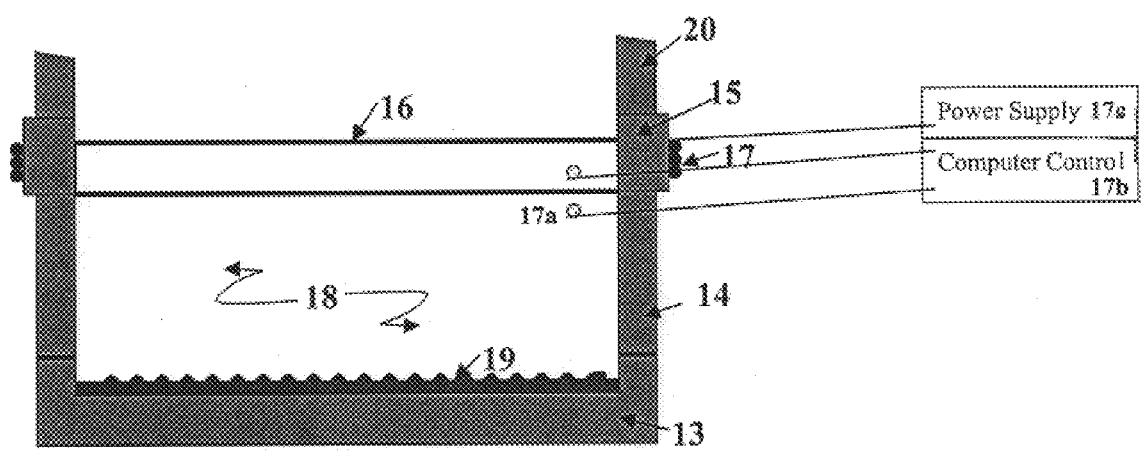
FIG. 2 shows a side view of the inventive detector apparatus showing the requirement of a thick floor component (13) forming the base of a cavity (18) which has rigid side walls (14) and made of common plastic or metal construction materials. The cavity further contains a top element of optically transparent material (16). The side walls (14) are joined to top element (16) by a heat conducting fixture (15).

With regard to FIG. 2, the thick solid floor component (1) is made to be earth level and is made for a solid polymeric material. The thickness of the floor component is from about 5 mm to about 7.5 mm. The functional characteristics of the solid polymeric material are: i) minimal attenuation of the ultrasound transmission, ii) a velocity of shear wave mode ultrasound propagation that results in an acoustical impedance being closely matched with water or other commonly-used ultrasonic propagating media (e.g., aqueous solutions) (13), iii) a velocity of longitudinal wave mode propagation that will achieve full reflection for angles of incident ($\Phi_1$ of FIG. 3) of greater than 60 degrees from normal to an interface with water. A preferred polymeric material is a rigid plastic have an impedance value for longitudinal sound energy waves of greater than 1497 but less than 2500 and for shear wave propagation of 1170 to 1900 m/sec and an ultrasonic impedance of greater than 1800 but less than 2500. Preferably, the plastic material is selected from the group consisting of polycarbonate, PVC, polystyrene, cross-linked polystyrene, and polymethylpentene.

Further properties are to have water absorption of less than 0.1%, be nonhazardous, contain no ingredients harmful to the environment, and have a machinability such that dimension accuracy of 0.000254 cm can be obtained by grinding. An example of a floor component material that will meet these specifications is cross-linked polystyrene. Preferably, the floor component material has both top and bottom surfaces machined to a flatness of not more than +/−0.02 mm. The area of the floor component is preferably in the shape of an rectangle with a "V" shaped end that is positioned away from the direction of horizontal propagation of the reference ultrasonic energy. This shape contributes to the elimination of residual surface sound waves that could distort subsequent images when operating at a high frame rate (e.g., greater than 120 images per second). The dimensions of the floor component is typically such that the illumination falls within the boundaries of the floor component and can typically be of gross dimensions of 15 cm by 20 cm. The floor component is machined such that there is a ridge around the exterior boundary of the floor component of at least 2 mm in height. The purpose is to form a container within the cavity in which to hold fluid when the floor component is maintained in a plane perpendicular to the direction of earth gravity.

The inventive apparatus further comprises (FIG. 2) a rigid upper housing (20) that is attached to the component 15 that attaches the upper housing to the side wall (14) of the detector which in turn is attached to the raised edges of the thick solid flat floor component (13) but which provides an open cavity (18) above the floor of at least 1 cm but less than 5 cm in height. The thick solid flat floor component form a two-dimensional rectangular in shape (when viewed from a top above the floor or bottom below the floor) (FIG. 5) with an upper end of the rectangle being "V" shaped and coming to a rounded point (25 of FIG. 4). The purpose of this shape is to have a place for any surface waves (26) on the imaging liquid (19) to dissipate in the rounded point which is placed away from the location and direct of propagation of the ultrasonic reference wave (7) from the reference transducer.

Figure 4:
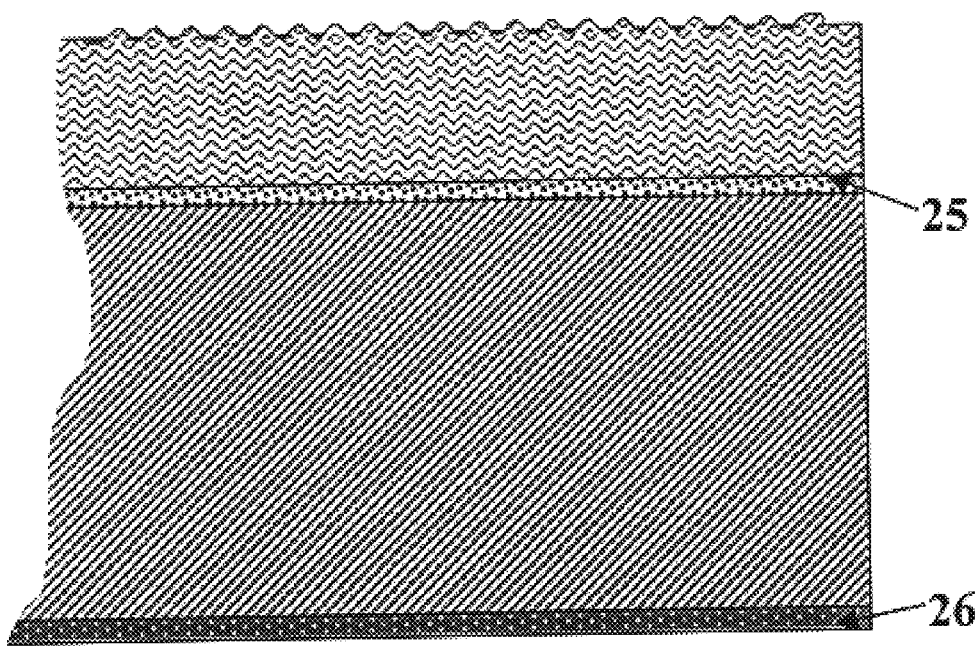
FIG. 4 shows an additional inventive characteristic of the detector floor component that may contain ¼ wavelength matching layers on both the top surface and the bottom surface of the floor component. This feature will minimize reflections of the longitudinal waves entering the floor component from the media into the floor component and that leaving the floor component and entering the detector fluid.
Figure 5:
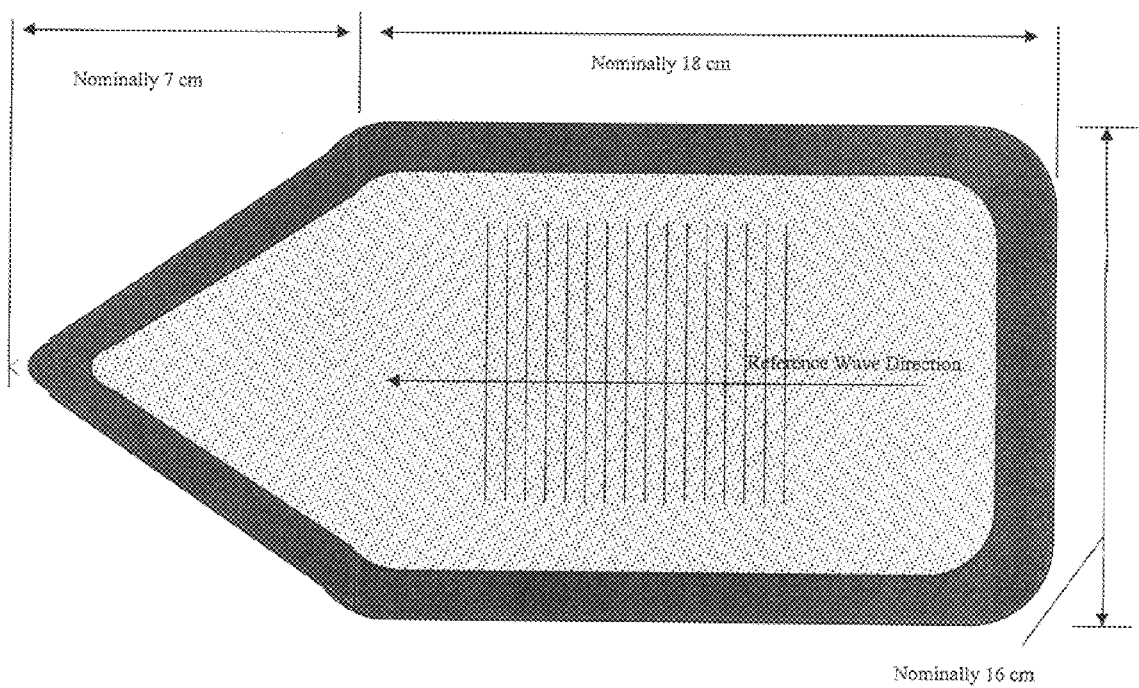
FIG. 5 shows a top view of the inventive detector, floor component.

In an alternative embodiment, FIG. 4 shows a detector floor component that may contain ¼ wavelength matching layers on both the top surface and the bottom surface of the floor component. This feature minimizes reflections of the longitudinal waves entering the floor component from the media into the floor component and that leaving the floor component and entering the detector fluid. The ¼ wave matching layer between the floor component is to be selected to have an ultrasonic impedance (velocity times density) of $(zB*zF)^{0.5}$, wherein zB is the ultrasonic impedance of the base material and zF is the ultrasonic impedance of the fluid.

The matching layer between the floor component and the media is selected to have an ultrasonic impedance (velocity times density) of $(zB*zM)^{0.5}$, where zM is the ultrasonic impedance of the transmission media, preferably water. In both cases zB is chosen to be a number that is between the impedance for the longitudinal and shear wave modes, preferable mid range between these two values.

Cavity

FIG. 2 shows a side view of the inventive detector apparatus showing the requirement of a thick floor component (13) forming the base of a cavity (18) which has rigid side walls (14) and made of common plastic or metal construction materials. The rigid side walls are preferably from 1 cm to 5 cm in height. The cavity further contains a top element of optically transparent material (16), preferably glass and may be an optical lens. The side walls (14) are joined to top element (16) by a heat conducting fixture (15), preferably metal and commonly aluminum or steel, on which is contained a thermally attach a heating element (17). The heating element comprises a means for monitoring the temperature of the optical transparent element (16) and the temperature within the cavity (18). Most preferably, there is a computer controlled means to maintain the temperature of the optically transparent top element (16) at a temperature of preferably 3 to 10° C. above the temperature of the cavity.

This apparatus is then preferably attached to a solid frame structure (20) that is part of the optical reconstruction subsystem of the ultrasonic imaging system. The sealed cavity (18) is purged of air and fill to a positive pressure (preferably less than *50 torr) with an inert gas, for example, helium. Within the cavity, a liquid (19) is placed to cover the floor component to a thickness of greater than 0.2 mm but less than 0.5 mm. The detection liquid preferably is a fluorinated organic compound having a surface tension from about 12 to 19 dynes/cm and a Kinematic viscosity of from about 1 cs to about 20 cs but may be of water which has been treated to reduce the surface tension.

When operational, the cavity (18) contains a thin layer of a detection fluid (19). The layer of detection fluid is contained with the cavity. The detection fluid has a thickness greater than 0.2 and less than 0.5 mm and most preferably at a thickness that is a multiple of ¼ wavelengths of the ultrasonic energy wave in the fluid, at the frequency being used in imaging. Preferably, the detection fluid has a surface tension of from about 12 dynes/cm to about 19 dynes/cm, a Kinematic viscosity of from about 1 cs to about 20 cs, a vapor pressure of from about 1 torr to about 5 torr, and a velocity of sound of less than 1,000 m/Sec but may approach than of water is a surface tension altering additive is used. These characteristics of the detection fluid are important to the operation as the hologram pattern will build-up on the surface within a reasonable time (e.g., less than 200 u sec) and maintain the sound energy waveform for a sufficient time to perform imaging (e.g., greater than 100 u sec) and yet be quiescent prior to the next image period (typically within 8.3 m sec–120 frame/second rate). Preferably the detection fluid is a fluorinated organic compound but may be water with a surface tension additives.

The cavity (18) is preferably sealed. It is preferably purged of air and replaced with an inert gas. Preferably, the inert gas is selected from the group consisting of nitrogen, helium, argon, and combinations thereof. This gas filled cavity is usually at atmospheric pressure but a small positive pressure can be permitted.

The apparatus is made to form the bottom of a sealed cavity (18) the top of which is sealed by an optical lens or optical transparent cover (16). The lens or optical plate is contained in a metal collar (15) that is part of the connective element between the hologram detector and the optical reconstruction assembly. The optical lens or optical transparent cover may be but not required to be isolated from the metal housing by a sealing gasket.

The thermal conducting collar of Item 15 incorporates an electrical heating element (17) placed on or in the collar (15) and contains temperature controls assembly (17b) together with an electrical power source (17c) that controls the temperature of the optical lens of transparent cover to a specified range. In the event this ring gets too cold (at a temperature below the main detector assembly), any out gassing and evaporation of the liquid in the detector will condense upon and cloud the lens or optical plate. In the event it gets too hot, the thermal gradients on the top of the liquid surface will distort and compromise the ability of the liquid surface to form the hologram. Thus, a temperature of 3 to 10° C. above ambient room temperature is maintained as the temperature of the optical lens or optical transparent cover. The controls of the heating element are such that the temperature of the optically transparent cover will be maintained at a higher ambient temperature than the interior of the cavity such that condensation of the optically transparent cover is minimized or eliminated. A temperature differential of approximately 6° C. is typical.

Figure 3:
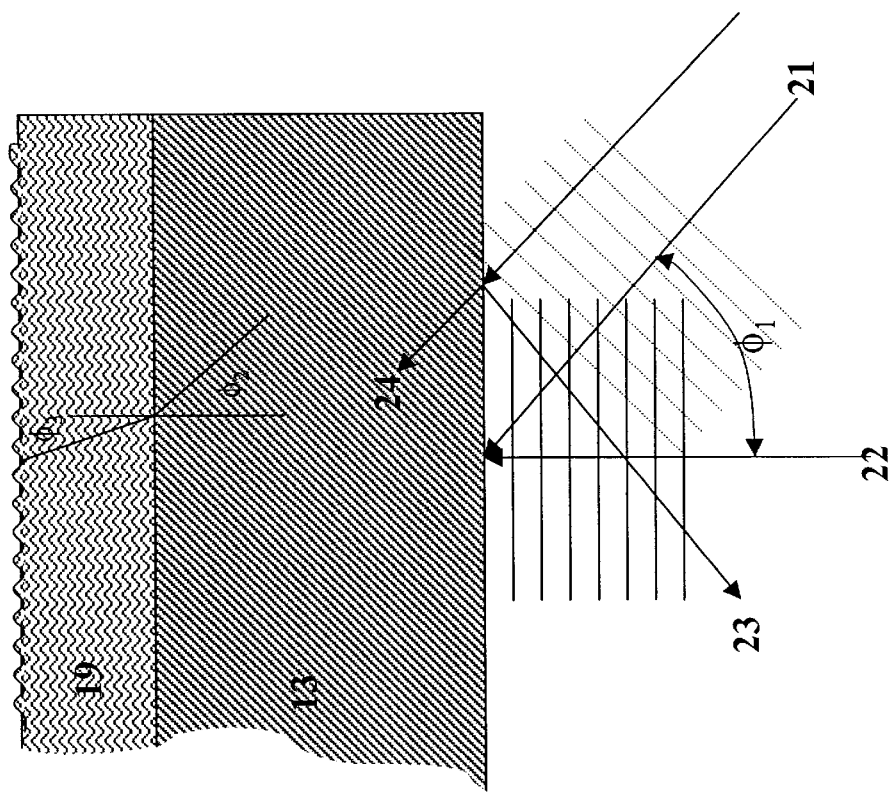
FIG. 3 shows an enlarged side view providing the angles of acoustic wave transmission and propagation to the bottom surface of the floor component, through the floor component, and through the detection fluid surface medium.

With regard to FIG. 3, the enlarged view shows the angles of ultrasonic energy transmission from the fluid transmission media (preferably water) to the floor component and into the detection fluid.

Wave Transmission

With regard to FIG. 3, the reference wave (21) is propagated toward the bottom surface of the floor component through a media preferably water) and is incident upon the lower surface of the floor component at an angle $\Phi_1$ with respect to the normal to the bottom surface of the floor component. In general this angle $\Phi_1$ is greater than 60 degrees. Upon striking the bottom surface, of the floor component, the reference wave (21) is divided into two components, namely the shear mode of ultrasonic wave propagation component (24) and the longitudinal wave mode of propagation component (23). The inventive process selects the material of the floor component such that the longitudinal mode of the reference wave conversion will all be (or mostly be) reflected leaving only a single reference wave (the shear wave mode portion) to enter the floor component and thereby interfere with the object wave (22). This forms a pure holographic pattern or other pure imaging pattern. To meet this characteristic, the longitudinal velocity in the floor component must be greater than the velocity in media/Sin $\Phi_1$. For example, if the media is water then the velocity in the media is approximately 1497 m/sec. Thus if $\Phi_1$ is 60 degrees then the longitudinal velocity in the floor component must be greater than 1497/0.866 or 1729 m/sec. Thus, when the incident angle ($\Phi$) is greater than 60 degrees to the normal and the longitudinal wave velocity in the floor component is greater than 1729 m/sec, all of the longitudinal mode wave conversion (23) will be reflected at the interface between the media and the floor component and only the shear wave mode (24) will enter the floor component and propagate to the liquid-air interface at the upper surface of the floor component. This is important to the operation of holographic imaging of subtle structures.

Since the object wave (22) is directed to the floor component at a perpendicular or near perpendicular angle, there is no or an insignificant mode conversion to shear wave. However, if the ultrasonic impedance of the floor component is different from the ultrasonic impedance of the media (which is true for most practical cases), there will be reflection at this interface. Included in the inventive design is the selection of the floor component material such that the ultrasonic impedance (velocity times density) for the floor material is greater 1,800 but less than 2,500. This will result in a reflection of less than 6.5% at the floor component/water media interface for the longitudinal mode wave propagation into the floor component from a water-based transmission media.

The detection material (19) is a fluid. Thus, only a longitudinal wave mode is propagated from the arrival of the reference wave (21) and object wave (22). Also when the longitudinal wave mode of propagation in the detector fluid (19) is slower than the shear wave mode velocity in the floor component, the incident angle $\Phi_2$ will be greater than $\Phi_3$. One part of the inventive process is to select the characteristics of the detector fluid such that it has the proper characteristics of surface tension, of 12 dynes/cm to about 19 dynes/cm, a Kinematic viscosity of 1 cs to 20 cs and a thickness of greater than 0.2 but less than 0.5 mm and most preferably a multiple of ¼ wavelength in the detector fluid at the frequency being used in imaging.

We claim:

1. An ultrasonic hologram detector apparatus comprising:
    (a) a rigid housing component describing a cavity defined by a floor component composed of rigid polymeric material having an upper surface forming a first plane and lower surface forming a parallel second plane, and rigid side elements attached to the base, wherein the, cavity defines an enclosed space of a dimension of the upper surface of the floor component and the rigid side elements of from about 1 cm to about 5 cm in height, wherein the distance between the upper surface and the lower surface of the floor component is from about 5 mm to about 7.5 mm;
    (b) a layer of detection fluid contained with the cavity, wherein the detection fluid has a thickness from about 0.2 mm to about 0.5 mm; wherein the detection fluid has a surface tension of from about 12 dynes/cm to about 19 dynes/cm, wherein the detection fluid has a Kinematic viscosity of from about 1 cs to about 20 cs; and
    (c) an inert gas filling a space in the cavity above the detection fluid.

2. The ultrasonic hologram detector apparatus of claim 1 wherein the detection fluid is a fluorinated organic compound.

3. The ultrasonic hologram detector apparatus of claim 1 wherein the inert gas is selected from the group consisting of nitrogen, helium, argon, and combinations thereof.

4. The ultrasonic hologram detector apparatus of claim 1 wherein the thickness of the layer of detection fluid is less than 0.254 mm.

5. The ultrasonic hologram detector apparatus of claim 4 wherein the thickness of the detection fluid is a multiple of ¼ wavelength of the ultrasonic energy being used.

6. The ultrasonic hologram detector apparatus of claim 1 wherein the ultrasonic hologram detector further comprises a top of the cavity composed of optically transparent material.

7. The ultrasonic hologram detector apparatus of claim 6 wherein the optically transparent material is glass.

8. The ultrasonic hologram detector apparatus of claim 7 wherein the glass is formed into an optical focusing element or an optically transparent sealing cover to the cavity.

9. The ultrasonic hologram detector apparatus of claim 6 wherein the optically transparent top cover further comprises a heating element associated and in contact with the cover.

10. The ultrasonic hologram detector apparatus of claim 1 wherein the floor component material is characterized by (i) attenuation of ultrasonic energy of less than 8% per cm of the material, (ii) a velocity of shear waves mode ultrasound propagation that results in acoustical impedance such that a reflection shear wave mode is less than 1.5% at the boundary of the floor component material and transmission liquid medium, and (iii) reflection of a longitudinal mode of propagation for angles of incidence of greater than 60 degrees from normal to an interface with the ultrasound liquid transmission medium, whereby a velocity for longitudinal mode of greater than 1730 m/sec.

11. The ultrasonic hologram detector apparatus of claim 10 wherein the transmission liquid medium is water, wherein the floor component material has an ultrasonic shear wave impedance of from about 1170 to about 1900.

12. The ultrasonic hologram detector apparatus of claim 10 wherein the velocity for longitudinal mode of the detection fluid is approximately 2600 m/sec.

13. The ultrasonic hologram detector apparatus of claim 1 wherein the detection fluid has vapor pressure of from about 1 torr to about 5 torr.

14. The ultrasonic hologram detector apparatus of claim 1 wherein the detection fluid has a velocity of sound of less than 1,000 m/sec.

* * * * *